United States Patent [19]

Schlamp

[11] Patent Number: 5,431,250
[45] Date of Patent: Jul. 11, 1995

[54] SYSTEM FOR THE SALE OF PRODUCTS

[75] Inventor: Hans Schlamp, München, Germany

[73] Assignee: Accumulata Verwaltungsgesellschaft, Munich, Germany

[21] Appl. No.: 63,828

[22] Filed: May 20, 1993

[30] Foreign Application Priority Data

May 22, 1992 [DE] Germany ............. 42 17 045.1

[51] Int. Cl.⁶ .............................................. E04H 3/04
[52] U.S. Cl. ........................................ 186/55; 235/381
[58] Field of Search .............. 186/52, 55, 56; 340/825.35; 364/478, 479; 235/381, 383, 91 L

[56] References Cited

U.S. PATENT DOCUMENTS

| 1,625,490 | 4/1927 | Morris . | |
| 2,888,197 | 5/1959 | Winn | 235/92 |
| 3,023,851 | 3/1962 | Stiller | 186/1 |
| 3,532,184 | 10/1970 | Blake | 186/56 |
| 3,716,697 | 2/1973 | Weir | 186/56 X |
| 3,741,345 | 6/1973 | Saridis | 186/55 |
| 3,824,544 | 7/1974 | Simjian | 186/56 X |
| 3,920,100 | 11/1975 | Dunphy | 186/56 X |
| 4,073,368 | 2/1978 | Mustapick | 186/1 |
| 5,158,155 | 10/1992 | Domain et al. | 186/55 X |
| 5,186,281 | 2/1993 | Jenkins | 186/55 |

FOREIGN PATENT DOCUMENTS

| 0359667 | 9/1989 | European Pat. Off. . | |
| 0396139 | 11/1990 | European Pat. Off. . | |
| 2343521 | 10/1977 | France . | |
| 4107519 | 9/1992 | Germany . | |
| 0237898 | 9/1989 | Japan | 186/56 |
| 84531 | 10/1984 | Luxembourg . | |
| 1531028 | 11/1978 | United Kingdom . | |
| 2202664 | 9/1988 | United Kingdom . | |

OTHER PUBLICATIONS

IBM Technical Disclosure Bulletin, vol. 17, No. 9, Feb. 1975 "Automated Retailing System", C. P. August.
Mayer, Caroline E., "When Will Grocers Get Smart", Jun. 12, 1991, Washington Post pp. E1 and E11.

Primary Examiner—Frank E. Werner
Assistant Examiner—Scott L. Lowe
Attorney, Agent, or Firm—Morgan & Finnegan

[57] ABSTRACT

The invention relates to a sales system for the sale and delivery of products. In connection therewith, a sample shop is located at a first location. A product distribution station is located at a second location, at a distance from the first location, and which is linked to the sample shop via a line for the purpose of data exchange. Single specimens of products are offered in the sample shop in the form of visual copies with information which can be queried. In the sample shop, each client receives a query device together with a data entry device. The client queries the information which corresponds to the visual copy by means of the query device and enters the number of items desired by him of the products which correspond to the visual copy using the data entry device. After receiving a collection card, the client goes to a product distribution station in order to collect the products about which information is communicated via the line concerning the desired products and the number of items together with information which identifies the client which is also to be found on the collection card.

15 Claims, 2 Drawing Sheets

SYSTEM FOR THE SALE OF PRODUCTS

FIELD OF THE INVENTION

The invention relates to a system for the sale and delivery of products

BACKGROUND OF THE INVENTION

Normally, products are held ready for sale in retail shops or similar establishments, selected by the purchaser and then distributed in return for payment of them. This means that all products which are planned to be sold must be stored and held available in shops which are equipped at great expense. Since storage space and sales space are in short supply and are expensive, this represents a problem because of the large storage space which is required for the products. A further problem of known retail shops consists in the fact that they make it necessary that a purchaser himself goes to the site where the shop is located in order to select and purchase the products which are desired by him. This means that purchasers drive in their cars to the retail shops in order to be able to transport the products which have been purchased. Traffic jams in the downtown area, especially on certain days when products are sold (in Germany, for example, on Thursday evenings and Saturdays when shops are open for sales) are the consequence.

SUMMARY OF THE INVENTION

The task of the present invention therefore consists in indicating a system for the sale of products as a result of which one avoids purchasers having to drive into the downtown area in their cars in order to purchase products.

The essential advantage of the present invention comprises the feature that, for the first time, purchasers can travel into the downtown area without their cars in order to purchase products, i.e. by making use of public transportation systems, because only original specimens or pictures of products are presented in the new types of sample shops and the purchaser can collect the products which are desired by him in the actual products storage areas at the periphery of cities, e.g. in special Park and Ride centers.

Especially advantageously, a client receives a scanning device or a similar arrangement in a sample shop in a downtown area with which he goes from shelf to shelf in order to make a selection from the products which are offered or from pictures of these products. Once he has decided to buy an article, he scans the bar code, which is arranged on the sample of the article or on the picture or on the shelf in the vicinity of the article, using the scanning device and types the number of items desired by him onto the keyboard of the scanning device. After the selection has taken place, he hands the scanning device in at the cash register and pays the amount corresponding to his purchases which is derived from the data which are stored in the scanning device. The client then obtains a collection card with which, after leaving the downtown area and travelling to the periphery of the city, he acquires his products in an extremely simple and practical manner and can then load them into his car which is parked there. The product distribution station contains storage halls in which the products offered in the sample shops are, for example, contained on high shelves or similar arrangements. The product distribution station is connected on-line to the sample shop via, for example, the public telephone network so that a message can go from the sample shop to the product distribution station concerning the products that must be made ready for the client. The staff in the product distribution station then removes these products from the storage area and makes them ready for collection in special distribution devices. These distribution devices are advantageously arranged in such a way that the client can automatically remove the products which are desired by him from one or more distribution apertures after inserting his collection card in a reading device. It is especially advantageous in that storage areas, which are located at the periphery, are less expensive than corresponding storage areas in the downtown area because of the lower cost per square meter of ground. In addition, the products can be held ready in these storage halls without expensive decoration schemes.

Additional advantageous embodiments of the invention are possible without depart from the spirit of the present invention.

The invention and its embodiments will be elucidated in more detail in the following sections in conjunction with the Figures.

DETAILED DESCRIPTION OF THE PREFERRED EMBODIMENT

Figure 1:
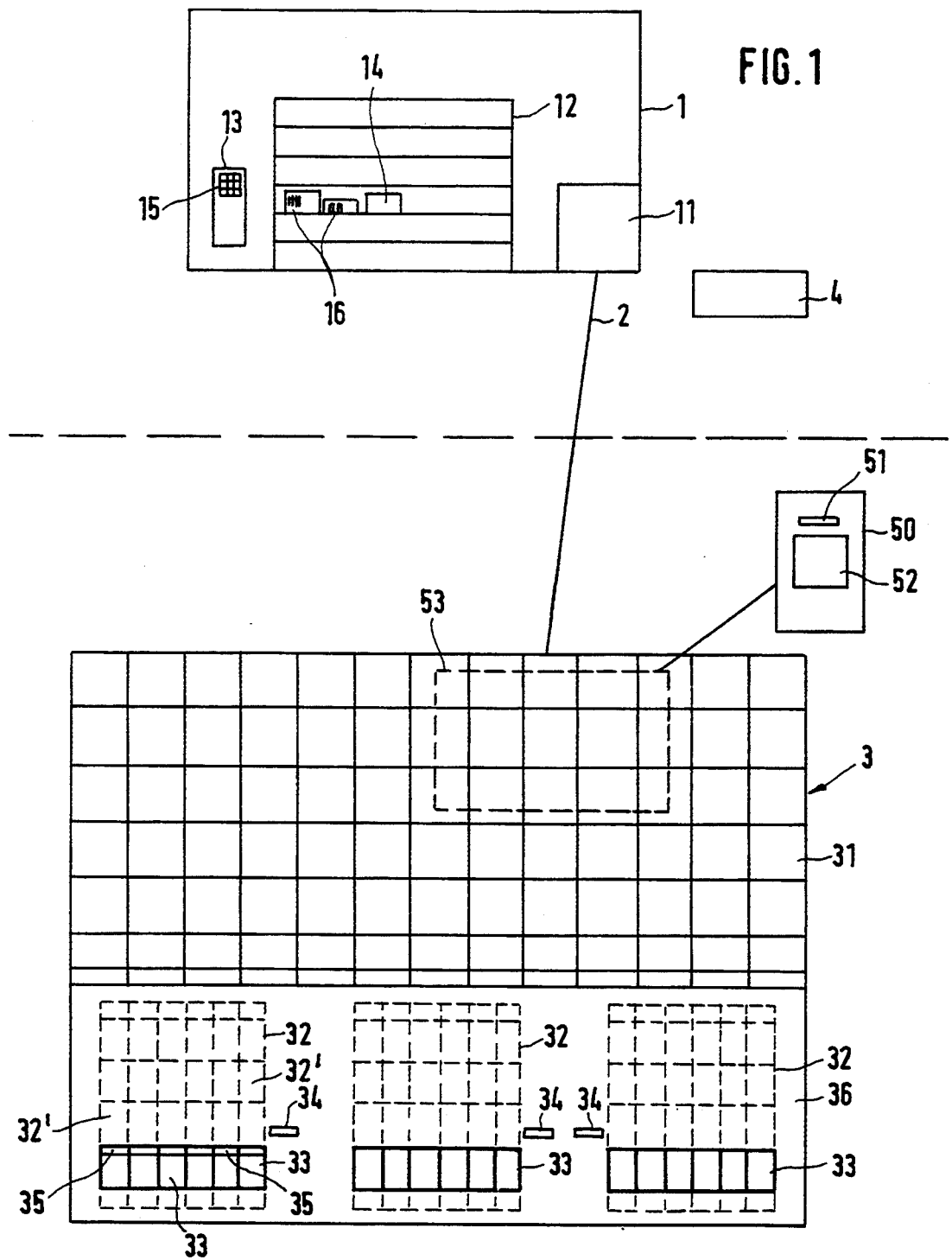
FIG. 1: shows a schematic representation in order to elucidate the system in accordance with the invention

In FIG. 1, the designation 1 refers to a sales facility in the form of a sample shop or a similar arrangement in a downtown area. A product distribution station 3 is located at the periphery—i.e. outside the downtown area—in, for example, the vicinity of a Park and Ride facility. The product distribution station 3 or its central computer 53 is on-line with the sample shop 1, preferably via a telephone line 2.

Original specimens of products or pictures and/or specifications of these products are offered on, for example, shelves 12 or similar arrangements as visual copies 14 in the sample shop 1. On entering the sample shop 1, a purchaser receives a scanning device 13 with a keyboard 15 and a memory. Using this scanning device 13, the purchaser goes to the shelf 12 in order to select the desired products after considering these products in accordance with the visual copies 14. When a purchaser wants to buy a particular article, he scans the bar code 16 on the visual copy 14' in question using the scanning device 13 and enters the number of items which are desired to be purchased via the keyboard 15 of the scanning device 13. This information is stored in the memory of the scanning device 13. Once a purchaser has scanned the bar code 16 of one or more visual copies 14 using his scanning device 13 in this manner and has entered, in each case, the number of items desired via the keyboard 15, he goes to the cash register 11 of the sample shop 1. Here—or already prior to this in a computer in the scanning device 13—the purchase costs are ascertained on the basis of the bar code information and the number of items entered into the computer or the data that are stored in the scanning device which were entered by the client are read and an invoice is compiled, or printed on the basis thereof. After paying with cash or by check etc., the purchaser obtains at the cash register 11 a collection card 4 in the form of a data carrier which is, for example, a bar code card or a magnetic card. At a later time, the purchaser can identify, with the help of this collection card 4, the products desired by him for collection at the product distribution station 3.

When the purchaser wishes to collect the products purchased in the sample shop 1, he goes—after having left the downtown area e.g. by means of the public transportation system—to the product distribution station 3 which has, in the meantime, been informed by the sample shop 1, via the telephone line 2, which products have to be made ready in the product distribution station 3 for the purchaser who can be identified by the collection card 4.

In a storage facility 31, which can be designed in any form and which can, for example, take the form of high shelves, elevator-like shelving or similar systems, the product distribution station 3 contains all the products corresponding to the visual copies 14 of the sample shop 1 in larger numbers of items. After the information, which is assigned to the collection card 4, has been transmitted to them via the telephone 2, the staff in the product distribution station 3 can now remove from the storage facility 31 the products which are desired by the purchaser and which are assigned to him by the particular collection card 4 and enter them in a product distribution facility 32. For example, such a product distribution facility 32 can be an elevator-like shelving system which has sections 32' arranged in series of slots on a continuous belt, e.g. a conveyor belt, which is capable of being driven in the vertical direction. The assembled products are entered in a section 32' of the product distribution facility 32 by the designated personnel. Each section of the product distribution facility 32 is capable of being driven behind a product distribution aperture 33. On stocking a section 32' with the desired products, the personnel of the product distribution station 3 enters information into a computer, which is not shown in detail, which identifies the purchaser in question, this information also being found on the collection card 4, which was transmitted via the telephone line 2.

After inserting his collection card 4 in a reading device 34, which is assigned to the product distribution facility 32, a display is given to the purchaser on a display facility 35—e.g. a flashing display lamp—as to which removal aperture 33 the section 32' documented for him is being served. The purchaser can then remove the products which have been collected for him from this section after, for example, opening an appropriate flap or similar arrangement which normally seals the section. Product distribution facilities 32 are preferably arranged in such a way in a wall 36 of the product distribution station 3 that a purchaser can drive in his car to the immediate vicinity of the distribution apertures 33 and thus load the products directly into his car.

However, it is also conceivable that purchasing wagons or transportation wagons are held ready in the vicinity of the product distribution station 3 with which the desired products can be collected at the distribution apertures 33 and transported to the car parking places in question in a parking lot.

The product distribution station 3 is preferably assigned to a preliminary terminal 50 with a reading device 51 for the collection card 4 and a display device 52 in the form of a monitor. The terminal 50 is, for example, located at the exit of the public transportation system and/or the entrance to the parking lot. After inserting the collection card 4, a display is given to the client on the monitor 52 as to which area of the product distribution station 3 which, for example, is subdivided into a foodstuffs area and a non-food area, the client has to go in order to obtain his products. In order to obtain the required information, the terminal is linked to the central computer 53 of the product distribution station which, for its part, is linked to line 2.

Reference is made to the feature that instead of the previously described elevator-like facility 32 as a product distribution device 32, all devices are conceivable in which products are removed from the stocked sections 32 and which can then be transported to at least one distribution aperture 33. This means that high shelving systems are also conceivable as product distribution facilities from the sections of which products can be removed with the help of robot-like devices and can then be transported to the distribution apertures 33. In the case of robot-like devices, we are dealing with e.g. grabbing systems which are movable to the individual sections of the product distribution facility 32 and, as the case may be, to the distribution apertures 33 by means of, for example, movement operations in the vertical and horizontal directions.

The product distribution station 31 can expediently be subdivided into an area with cooled sections and an area with uncooled sections.

In the following, special embodiments of the invention will be elucidated in more detail.

Figure 2:
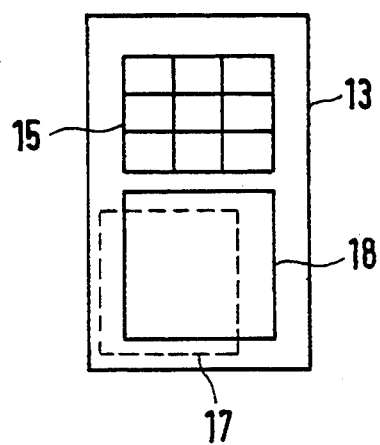
FIGS. 2 and 3: show further developments of the invention.

In order to be able to indicate to a client in the sample shop 1 whether the visual copies 14, in each case, of the products in question are actually present in the storage facilities 31 of the product distribution station 3, the bar code device 13 can have a memory device 17 in which information concerning the actual products inventory and the current cost of the products is entered prior to distribution to the client at the cash register 11. It can then be communicated immediately to the client on using the scanning device 13 after scanning a bar code 16 on a visual copy 14 by, for example, an alphanumeric indicator device or a display 18 (FIG. 2) whether or not the products in question are present in the desired number of items and what they cost.

In this connection, an advantageous side-effect is that a client can read off the price of each article on his scanning device so that time-consuming and costly pricing of the products can be dispensed with.

In order to be relatively sure that products corresponding to the visual copies 14 of the products in question are present, it is also possible to formulate the actual products inventory in the product distribution station 3 in accordance with probability and to be able to communicate to the client—if required at the cash register 11—based on information obtained after questioning via the telephone line 2 that the particular products are not available at that time.

Figure 3:
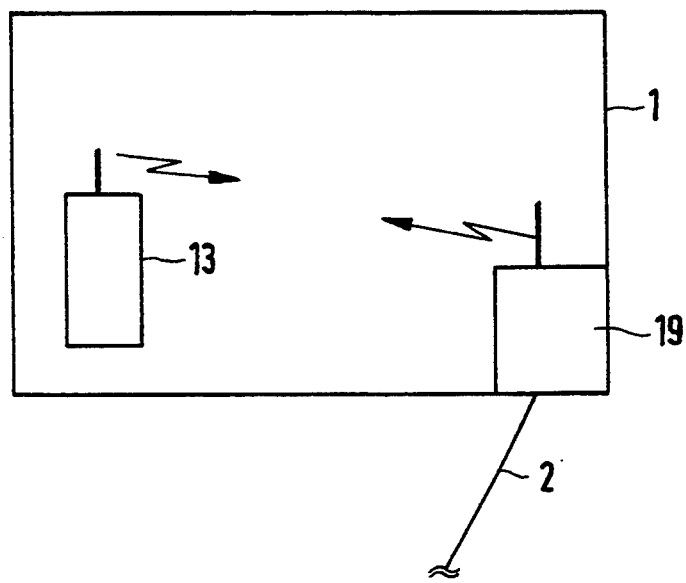

In accordance with FIG. 3, it is preferable to have a central computer 19 present at the cash register in the sample shop 1 which receives information at all times about the actual products inventory in the product distribution station 3 via the telephone line 2. Using this computer 19, it is then possible to reconcile the purchasing wishes of the client with the actual products inventory and to be able to inform the client accordingly of a deficient stock situation for an article at the cash register or even at the display unit 18. Debiting, which is undertaken in the sample shop 1, is communicated to the central computer. Each scanning device 13 in the sample shop 1 is wirelessly linked to the computer 19 (e.g. via a radio or infrared link) so that each client can debit products from this inventory on-line by activating his scanning device 13. In this way, the inventory which is stored in the central computer 19 is continuously updated. Thus a nonexistent inventory or an inventory level which is inadequate for his purchasing wishes becomes visible to the client. The computer 19 communicates such debiting to the central computer 53 on a continuous basis via the line 2.

In a further embodiment of the invention, the scanning device 13 is replaced by a device with a computer which recognizes speech which is continuously spoken to by clients approximately in the manner which applies in the case of dictation equipment. The computer converts the speech which it records into computer-readable data and stores these in an appropriate way so that evaluation at the cash register 11 can take place in the manner which has already been described.

The supply of electricity to the device 13 which is carried by the client is preferably delivered by a solar battery which is provided in this device and which is continuously recharged in the sample shop 1 via its illumination system.

Instead of the keyboard 15, the scanning device 13 can also have a notebook computer in which the client enters his wishes in regard to numbers of items via an electronic pen on a sensitive surface.

Once the scanning device 13 is linked to the aforementioned computer 19, it is then also possible not to store information concerning the type of products and the number of items selected by the client in the scanning device 13 but, rather, to transfer this continuously to the computer 19. This then continuously records the data transferred to it from all scanning devices 13 and evaluates these in order to print out the invoices which are then immediately available to clients at the cash register at the conclusion of the "purchasing process." A line of persons at the cash register is thus not required. The sample shop 1 can be operated by only one person so that personnel costs can be saved.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. Method for the sale and delivery of products comprising the steps of:
    a) in a sample shop which is located at a first location, providing each client with a query device, together with an entry device, wherein visual information is presented comprising descriptive product information in a visual or verbal format;
    b) after selecting a visual copy, the client requesting information which corresponds to the visual copy by means of the query device, and the client entering the desired number of items of the products that correspond to the visual copy using the entry device;
    c) based on the information received from the query device, compiling an invoice for the client at cash register;
    d) after settling the invoice and receiving a collection card, the client proceeding to a product distribution station at a second location at a distance from the first location, linking second location to the sample shop via a line for the purpose of data exchanges, communicating to a central computer of the product distribution center, information concerning the desired products and the number of items thereof together with information to identify the client, which is also present on the collection card,;
    e) containing within a storage facility, of the product distribution station, the products, in plural quantities corresponding to the visual copies,;
    f) based on the information communicated to the product distribution station, removing the products desired by the client from the storage facility and then inserting the products into a product distribution facility of the product distribution station, and delivering the products to a removal device; and
    g) the client inserting the collection card into a reading device, arranged at the product distribution facility, the reading indicating to the client by means of a display device, the removal device, to which the desired products have been delivered.

2. Method in accordance with claim 1, wherein the query information takes the form of a bar code on the visual copies.

3. Method in accordance with claim 1, wherein the query information takes the form of a bar code at the location assigned to the visual copies.

4. Method in accordance with claim 1, wherein the query device is a scanning device.

5. Method in accordance with claim 1, wherein the entry device is a keyboard.

6. Method in accordance with claim 1, wherein the entry device is a note-book computer.

7. Method in accordance with claim 1, wherein the collection card is a bar code card.

8. Method in accordance with claim 1, wherein the collection card is a magnetically encoded card.

9. Method in accordance with claim 1, wherein the storage facility takes the form of a high shelving device.

10. Method in accordance with claim 1, wherein the storage facility takes the form of a shelving device, whose sections are arranged in series on a continuous belt, which is capable of being driven.

11. Method in accordance with claim 1, wherein the product distribution station has at least one information terminal with a reading apparatus for the collection card and a display device, which is linked to the central computer, and displays on the display device at least one particular area of the product distribution facility at which the distribution of products takes place.

12. Method in accordance with claim 1, wherein a sample shop computer is provided in the sample shop, which is linked via the line to the central computer, to which information is communicated continuously from the central computer concerning the actual products inventor present, and each query device is wireless linked to the sample shop computer so that the client can obtain the actual products inventory with the query device.

13. Method in accordance with claim 1, wherein the product distribution facility has sections for accommodating the desired products, whereby said sections are capable of being driven to the removal device.

14. Method in accordance with claim 13, wherein the product distribution facility is an elevator-like device whose sections, which are arranged in series and compartments, are capable of being transported to the removal device which has distribution apertures corresponding to the sections which are arranged in the form of a series.

15. Method in accordance with claim 14, wherein the distribution apertures can be closed by movable flaps.

* * * * *